(12) United States Patent
Croak et al.

(10) Patent No.: US 8,804,703 B2
(45) Date of Patent: *Aug. 12, 2014

(54) METHOD AND APPARATUS FOR PROVIDING SHARED SERVICES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/615,408

(22) Filed: Sep. 13, 2012

(65) Prior Publication Data

US 2013/0003724 A1 Jan. 3, 2013

Related U.S. Application Data

(63) Continuation of application No. 12/647,479, filed on Dec. 26, 2009, now Pat. No. 8,279,856, which is a continuation of application No. 11/027,829, filed on Dec. 30, 2004, now Pat. No. 7,664,099.

(51) Int. Cl.
*H04L 12/66* (2006.01)
*G06F 7/04* (2006.01)
*G06Q 10/00* (2012.01)

(52) U.S. Cl.
USPC ........... 370/352; 370/230; 370/252; 370/328; 370/395.2; 379/88.12; 379/201.01; 705/7.38; 705/14.26; 709/217; 709/218; 709/223; 709/229; 718/106; 719/315

(58) Field of Classification Search
CPC ................................ H04L 12/66; H04L 29/06

USPC ...................... 370/230, 252, 328, 352, 395.2; 379/88.12, 201.01; 705/7.38, 14.26; 709/217, 218, 219, 223, 229, 232; 718/106; 719/315

See application file for complete search history.

(56) References Cited

U.S. PATENT DOCUMENTS

| | | |
|---|---|---|
| 6,226,277 B1 | 5/2001 | Chuah |
| 6,442,136 B1 | 8/2002 | Sugama et al. |
| 6,584,184 B1 | 6/2003 | Nabkel et al. |
| 6,671,258 B1 | 12/2003 | Bonneau |
| 6,714,545 B1 | 3/2004 | Hugenberg et al. |
| 6,763,000 B1 | 7/2004 | Walsh |
| 6,879,960 B2 | 4/2005 | Nascenzi et al. |
| 6,973,033 B1 | 12/2005 | Chiu et al. |
| 6,999,759 B2 | 2/2006 | Harris et al. |
| 7,072,861 B1 | 7/2006 | Yamanaka et al. |
| 7,075,912 B2 | 7/2006 | Suda et al. |
| 7,107,620 B2 | 9/2006 | Haverinen et al. |
| 7,167,546 B2 | 1/2007 | Moore |
| 7,299,478 B2 * | 11/2007 | Bagsby ........................ 719/315 |
| 7,411,905 B1 | 8/2008 | Cook et al. |
| 7,411,942 B1 | 8/2008 | Croak et al. |
| 7,415,434 B2 | 8/2008 | Adduci et al. |
| 7,474,627 B2 | 1/2009 | Chheda et al. |
| 7,539,764 B2 * | 5/2009 | Bagsby ........................ 709/229 |
| 7,568,020 B2 * | 7/2009 | Bagsby ........................ 709/223 |
| 7,590,547 B2 | 9/2009 | Lagadec et al. |
| 7,606,156 B2 | 10/2009 | DeLangis |

(Continued)

*Primary Examiner* — Gerald Gauthier

(57) ABSTRACT

The present invention enables an overlay capability to be invoked on network systems and elements that are designed to support multiple customer bases. Depending on the registered identification of the user, screens and other user interfaces that provide access to functions can be overlaid on the network component and segmented along customer classifications.

20 Claims, 4 Drawing Sheets

(56) References Cited

U.S. PATENT DOCUMENTS

| | | |
|---|---|---|
| 7,664,099 B1 * | 2/2010 | Croak et al. .................. 370/352 |
| 7,668,747 B2 | 2/2010 | Murphy et al. |
| 7,881,446 B1 | 2/2011 | Apple et al. |
| 7,912,036 B2 | 3/2011 | Moore |
| 7,979,571 B2 | 7/2011 | Dillon et al. |
| 8,019,829 B2 | 9/2011 | Cocotis et al. |
| 8,239,246 B1 * | 8/2012 | Bigham et al. ............... 705/7.38 |
| 8,279,856 B2 * | 10/2012 | Croak et al. .................. 370/352 |
| 2002/0107939 A1 * | 8/2002 | Ford et al. ..................... 709/218 |
| 2003/0154272 A1 | 8/2003 | Dillon et al. |
| 2004/0218604 A1 | 11/2004 | Porter |
| 2005/0015771 A1 * | 1/2005 | Bagsby ........................ 718/106 |
| 2006/0098632 A1 | 5/2006 | Johnson |
| 2007/0286213 A1 | 12/2007 | Fodor et al. |
| 2008/0049639 A1 | 2/2008 | Wiley et al. |
| 2010/0098066 A1 * | 4/2010 | Croak et al. .................. 370/352 |
| 2013/0003724 A1 * | 1/2013 | Croak et al. .................. 370/352 |

* cited by examiner

METHOD AND APPARATUS FOR PROVIDING SHARED SERVICES

This application is a continuation of U.S. patent application Ser. No. 12/647,479, filed Dec. 26, 2009, (currently allowed) which is a continuation of U.S. patent application Ser. No. 11/027,829, filed Dec. 30, 2004, now U.S. Pat. No. 7,664,099. The aforementioned related patent applications are herein incorporated by reference.

The present invention relates generally to communication networks and, more particularly, to a method and apparatus for enabling shared consumer and business service platforms in communication networks, e.g., Voice over Internet Protocol (VoIP) networks.

BACKGROUND OF THE INVENTION

Network service providers typically support both consumer and business customers on separate platforms. Although the network elements to support this diverse customer base may be identical, the features and backend billing and ordering functions required by residential and business customers are quite different. It is too costly to build and maintain separate network systems and network elements for different classes of customers.

Therefore, a need exists for a method and apparatus for enabling shared consumer and business service platforms in packet-switched networks, e.g., VoIP networks.

SUMMARY OF THE INVENTION

In one embodiment, the present invention enables an overlay capability to be invoked on network systems and network elements that are designed to support multiple customer bases or classes. Depending on the registered identification of the user, screens and other user interfaces that provide access to functions can be overlaid on the network component and segmented along customer classifications.

To illustrate, a web based provisioning system would present an individual residential user a screen to populate their personal identification and billing information, and at the same time, present an enterprise administrator another screen to populate multiple employees' identifications and sub-accounts on one enterprise invoice and so on.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
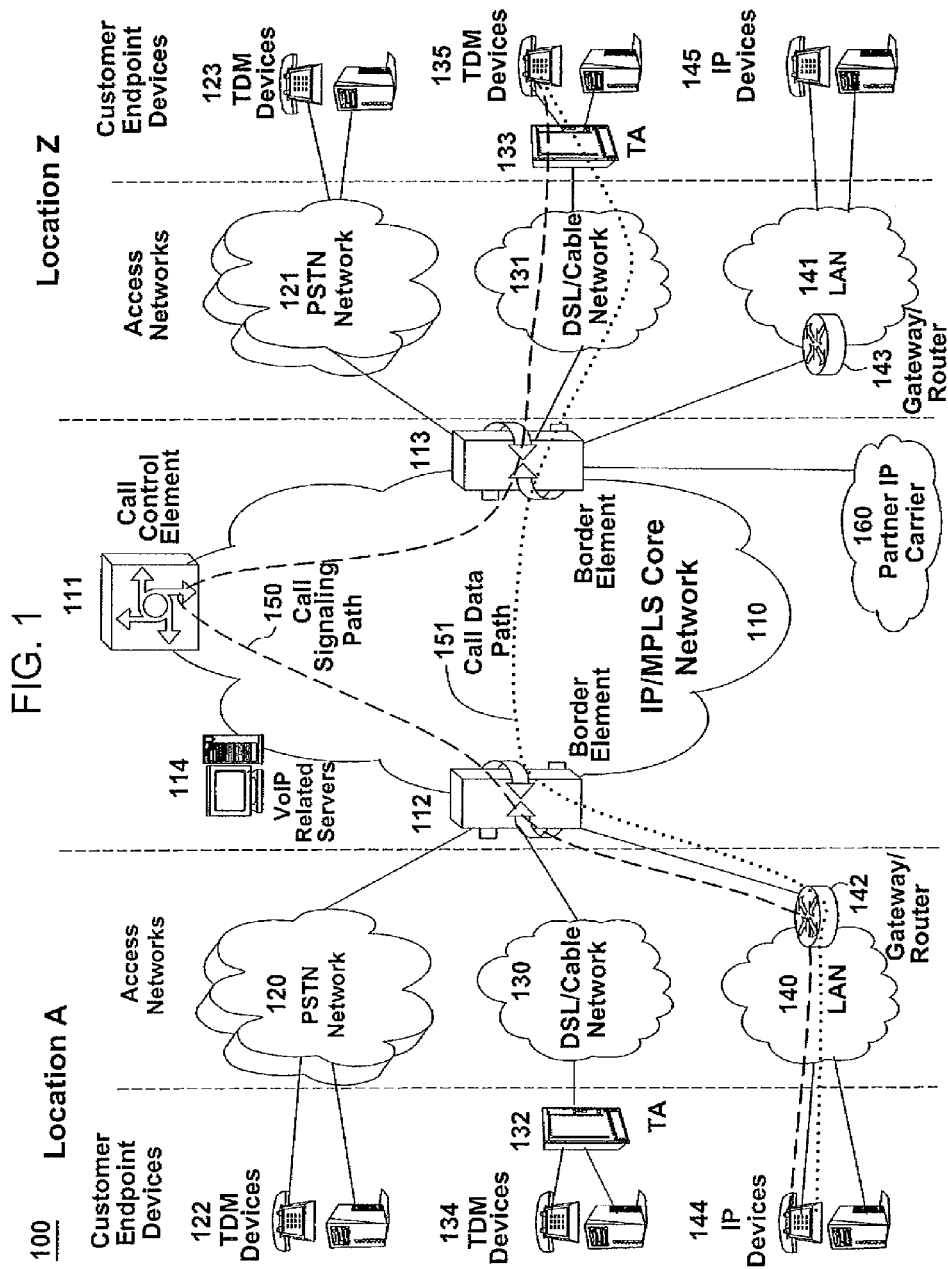
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP network service providers typically support both consumer and business customers on separate platforms. Although the network elements to support this diverse customer base may be identical, the features and backend billing and ordering functions required by residential and business customers are quite different. It is too costly to build and maintain separate network systems and network elements for different classes of customers.

To address this criticality, the present invention enables an overlay capability to be invoked on network systems and network elements that are designed to support multiple customer bases or classes. Depending on the registered identification of the user, screens and other user interfaces that provide access to functions can be overlaid on the network component and segmented along customer classifications. To illustrate a web based provisioning system would present an individual residential user a screen to populate their personal identification and billing information, and at the same time, present an enterprise administrator a screen to populate multiple employees' identifications and sub-accounts on one enterprise invoice.

Figure 2:
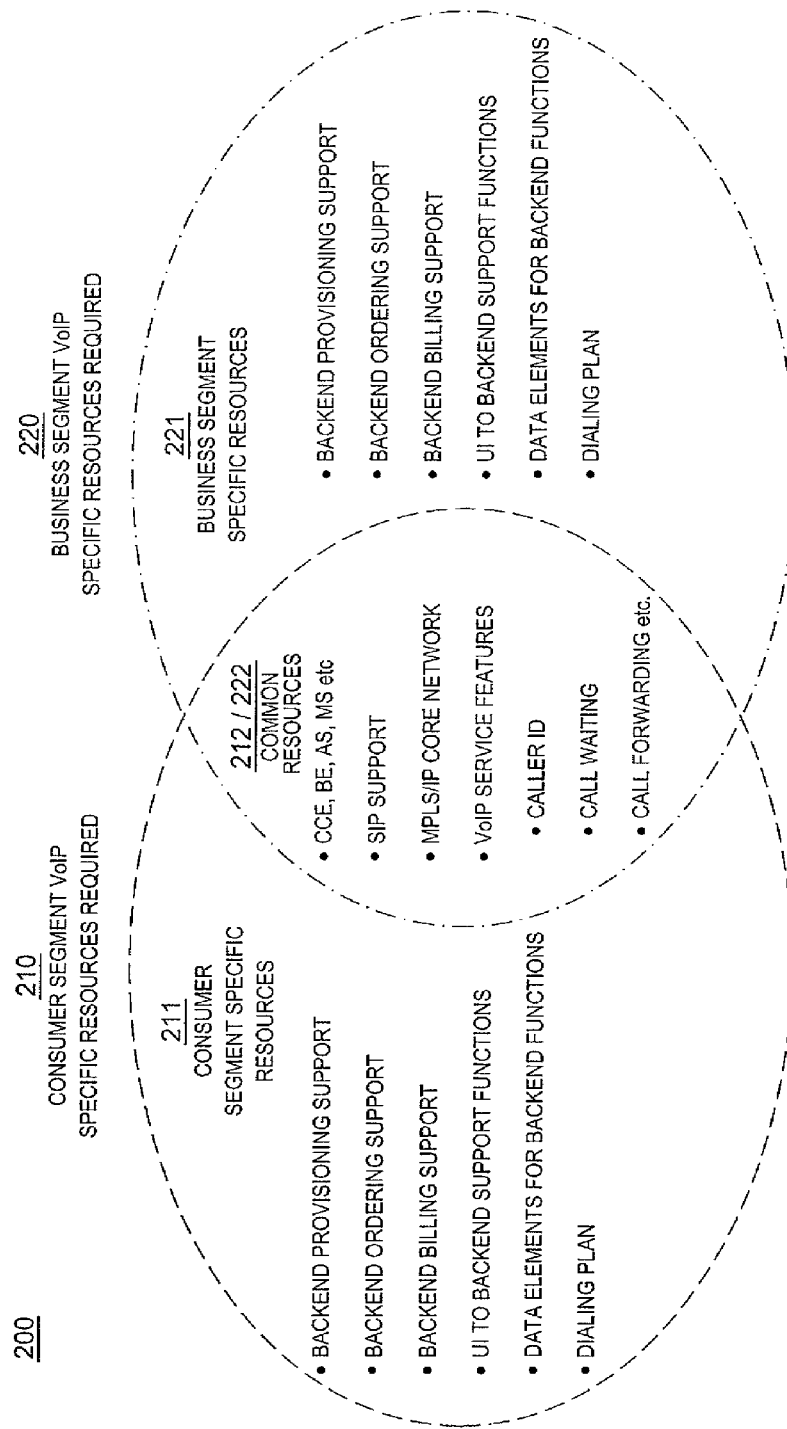
FIG. 2 illustrates an example of identifying customer class specific resource and common resource support in a VoIP network of the present invention.

FIG. 2 illustrates an example of identifying customer class specific resource and common resource support in a packet-switched network, e.g., a VoIP network. FIG. 2 shows that for consumer VoIP services (e.g., a first consumer class), a set of resources 210 is required to support the service functions and needs. Similarly, for business VoIP services (e.g., a second consumer class), a set of resources 220 is required to support the service functions and needs. Within the resource set 210, the required support can be further divided into consumer segment specific resources, 211, and common resources, 212, that are required by other customer class services as well. Similarly, within the resource set 220, the required support can be further divided into business segment specific resources, 221, and common resources, 222, that are required by other customer class services as well. Resource subset 212 and 222 are overlapping service functions required that are common for both the consumer segment services and the business segment services.

Consumer segment specific resource subset 211 comprises, but is not limited to, functions such as:
consumer segment specific backend provisioning support
consumer segment specific backend ordering support
consumer segment specific backend billing support
consumer segment specific user interface pertaining to backend functions support
consumer segment specific data elements pertaining to backend functions support
consumer segment specific dialing plan.

Business segment specific resource subset 221 comprises, but is not limited to, functions such as:
business segment specific backend provisioning support
business segment specific backend ordering support
business segment specific backend billing support
business segment specific user interface pertaining to backend functions support
business segment specific data elements pertaining to backend functions support
business segment specific dialing plan.

Common resource subset 212 or 222 comprises, but is not limited to, functions such as:
use of common network elements including CCE, BE, Application Server (AS), Media Server (MS) etc
common Session Initiation Protocol (SIP) support
use of common Multi-Protocol Label Switching/Internet Protocol (MPLS/IP) core network
common VoIP service features including caller ID, call waiting, call forwarding etc.

For customer class specific resources, the backend ordering support includes functions that enable the network provider to receive and record orders of services that are subscribed by customers; the backend provisioning support includes functions that enable the network provider to setup and install services that are subscribed by customers; and the backend billing support includes functions that enable the network provider to bill for services that are used by customers. For all these backend support functions, a set of corresponding user interface screens as well as a set of corresponding data elements are also required to support these functions. For instance, for consumer customers, user interface screens and their associated data elements typically deal with customers using one billing party name with one or more registered phone lines. However, for business customers, user interface screens and associated data elements have to deal with multiple users of the same company under a single registered billing account and each user may have different service subscription plan that are different from other users within the same company. In addition, dialing plans specific to customer class also are required. For instance, consumer customers typically use 10 digit phone numbers for dialing other customers; however, business customers not only use 10 digit phone numbers and they may also use abbreviated dialing string, such as 5 digit phone numbers, for calling others between different locations of the same company.

If a network provider has to build one network with all the necessary platforms to support consumer segment customers, all functions in resource set 210 will be required. If a network provider has to build one network with all the necessary platforms to support business segment customers, all functions in resource set 220 will be required. If the network provider has to build two separate independent networks to support both consumer segment functions and business segment functions, the cost effectiveness of such an approach will be low. Given that there are overlapping needs between the two service segments, a shared network that supports both consumer segment and business segment functions is a very attractive approach from a cost perspective. Therefore, by leveraging the overlapping resources and functions required by both segments of services and by consolidating customer class specific functions onto the same corresponding network elements and network systems, a network provider can lower the overall costs of building a network that can support customers of both service segments.

Figure 3:
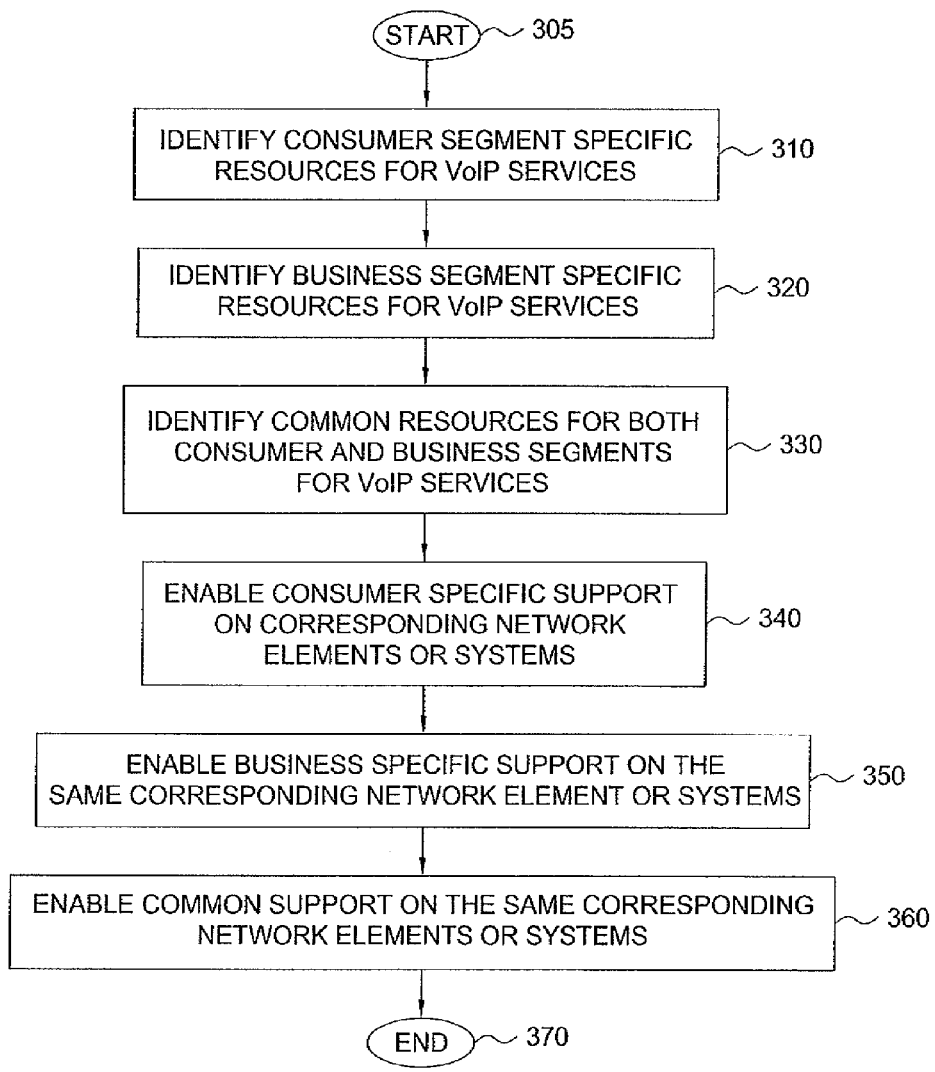
FIG. 3 illustrates a flowchart of a method for enabling shared consumer and business services platform in a VoIP network of the present invention.

FIG. 3 illustrates a flowchart of a method for enabling shared consumer and business services platforms in a packet-switched network, e.g., a VoIP network. Method 300 starts in step 305 and proceeds to step 310.

In step 310, the method identifies the consumer segment (e.g., a first customer class) specific service resources and functions required for VoIP services. In step 320, the method identifies the business segment (e.g., a second customer class) specific service resources and functions required for VoIP services. In step 330, the method identifies the common service resources and functions required for both segments for VoIP services. In step 340, the method provides the consumer segment specific support on the corresponding network elements and network systems. In step 350, the method provides the business segment specific support on the same corresponding network elements and network systems. In step 360, the method provides common support for both service segments on the same corresponding network elements and network systems. The method ends in step 370.

Figure 4:
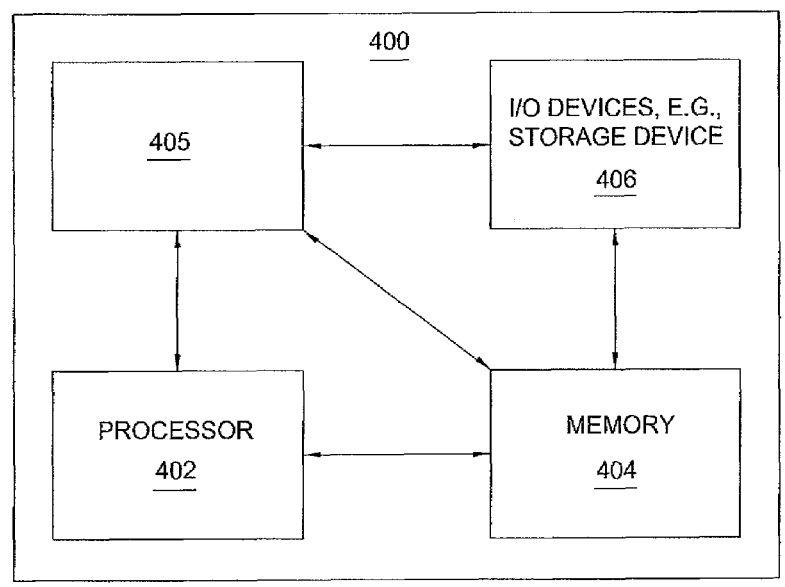
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a shared services module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present shared services module or process 405 can be loaded into memory 404 and executed by processor 402 to implement the functions as discussed above. As such, the present shared services process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing shared services in a communication network, comprising:
   identifying, by a processor, a service that is provided to a consumer segment via a consumer segment specific service resource;
   identifying, by the processor, a service that is provided to a business segment via a business segment specific service resource; and
   identifying, by the processor, a common resource from the consumer segment specific service resource and the business segment specific service resource that is to be used for supporting the service for the consumer segment and the service for the business segment, wherein the common resource comprises a network element of the communication network.

2. The method of claim 1, wherein the communication network comprises a packet network.

3. The method of claim 2, wherein the packet network comprises a voice over internet protocol network.

4. The method of claim 1, wherein the common resource further comprises a backend system within the communication network.

5. The method of claim 1, wherein the common resource comprises a call control element.

6. The method of claim 1, wherein the common resource comprises a border element.

7. The method of claim 1, wherein the common resource comprises an application server.

8. A tangible computer-readable medium storing a plurality of instructions which, when executed by a processor, cause the processor to perform operations for providing shared services in a communication network, the operations comprising:
   identifying a service that is provided to a consumer segment via a consumer segment specific service resource;
   identifying a service that is provided to a business segment via a business segment specific service resource; and
   identifying a common resource from the consumer segment specific service resource and the business segment specific service resource that is to be used for supporting the service for the consumer segment and the service for the business segment, wherein the common resource comprises a network element of the communication network.

9. The tangible computer-readable medium of claim 8, wherein the communication network comprises a packet network.

10. The tangible computer-readable medium of claim 9, wherein the packet network comprises a voice over internet protocol network.

11. The tangible computer-readable medium of claim 8, wherein the common resource further comprises a backend system within the communication network.

12. The tangible computer-readable medium of claim 8, wherein the common resource comprises a call control element.

13. The tangible computer-readable medium of claim 8, wherein the common resource comprises a border element.

14. The tangible computer readable medium of claim 8, wherein the common resource comprises an application server.

15. An apparatus for providing shared services in a communication network, comprising:

a processor; and a computer-readable medium storing a plurality of instructions which, when executed by a processor, cause the processor to perform operations, the operations comprising:

identifying a service that is provided to a consumer segment via a consumer segment specific service resource;

identifying a service that is provided to a business segment via a business segment specific service resource; and identifying a common resource from the consumer segment specific service resource and the business segment specific service resource that is to be used for supporting the service for the consumer segment and the service for the business segment, wherein the common resource comprises a network element of the communication network.

16. The apparatus of claim 15, wherein the communication network comprises a packet network.

17. The apparatus of claim 16, wherein the packet network comprises a voice over internet protocol network.

18. The apparatus of claim 15, wherein the common resource further comprises a backend system within the communication network.

19. The apparatus of claim 15, wherein the common resource comprises a call control element.

20. The apparatus of claim 15, wherein the common resource comprises a border element.

* * * * *